(12) United States Patent
Hill et al.

(10) Patent No.: US 10,946,635 B2
(45) Date of Patent: Mar. 16, 2021

(54) THREE DIMENSIONAL PRINTING SYSTEM ADAPTABLE TO VARYING RESIN TYPES

(71) Applicant: 3D Systems, Inc., Rock Hill, SC (US)

(72) Inventors: Rodney Hill, Mount Angel, OR (US); Keaton Jonathan Daniel Snyder, Donald, OR (US)

(73) Assignee: 3D Systems, Inc., Rock Hill, SC (US)

( * ) Notice: Subject to any disclaimer, the term of this patent is extended or adjusted under 35 U.S.C. 154(b) by 0 days.

(21) Appl. No.: 16/365,010

(22) Filed: Mar. 26, 2019

(65) Prior Publication Data

US 2019/0299530 A1 Oct. 3, 2019

Related U.S. Application Data

(60) Provisional application No. 62/649,019, filed on Mar. 28, 2018.

(51) Int. Cl.
*B33Y 30/00* (2015.01)
*B29C 64/393* (2017.01)
(Continued)

(52) U.S. Cl.
CPC .............. *B33Y 30/00* (2014.12); *B29C 31/02* (2013.01); *B29C 64/106* (2017.08); *B29C 64/124* (2017.08); *B29C 64/259* (2017.08); *B29C 64/321* (2017.08); *B29C 64/393* (2017.08); *B33Y 40/00* (2014.12); *B33Y 50/02* (2014.12); *B65D 90/00* (2013.01); *B05B 9/042* (2013.01);
(Continued)

(58) Field of Classification Search
CPC .. B41J 2/17509; B41J 2/17566; B41J 2/1752; B41J 2002/17516; B41J 2002/14491; B33Y 30/00; B33Y 40/00; H02G 3/14; B05B 15/20; B05B 15/25; B05B 15/58; B05B 1/3046; B05B 9/04; B05B 9/042
See application file for complete search history.

(56) References Cited

U.S. PATENT DOCUMENTS 4,211,519 A * 7/1980 Hogan ................ F04B 43/1253
                                                       417/360
6,065,824 A * 5/2000 Bullock ............... B41J 2/17523
                                                        347/19
(Continued)

FOREIGN PATENT DOCUMENTS

CN          204019803        12/2014

OTHER PUBLICATIONS

PCT International Search Report the International Searching Authority for PCT/US2019/024063, dated Aug. 27, 2019 (10 pages).
(Continued)

*Primary Examiner* — Darrin D Dunn

(57) ABSTRACT

A kit enables an efficient and contamination-free method of changing a resin used in a three dimensional printer from a first resin to a second resin. The three dimensional printer includes a print engine and a receptacle. The kit includes a conduit assembly and a resin container. The conduit assembly includes a fluid inlet configured to be affixed in the receptacle in an upward orientation, a pump head configured to be coupled to a motorized pump actuator in the receptacle, (Continued)

a first conduit coupling the fluid inlet to the pump head, a fluid outlet configured to supply resin to the print engine, and a second conduit coupling the pump head to the fluid outlet.

18 Claims, 15 Drawing Sheets

(51) Int. Cl.
    *B29C 64/321*     (2017.01)
    *B33Y 40/00*     (2020.01)
    *B29C 31/02*     (2006.01)
    *B29C 64/259*     (2017.01)
    *B65D 90/00*     (2006.01)
    *B05B 9/043*     (2006.01)
    *B05B 15/25*     (2018.01)
    *B29C 64/106*     (2017.01)
    *B33Y 50/02*     (2015.01)
    *B29C 64/124*     (2017.01)
    *B05B 9/04*     (2006.01)
(52) U.S. Cl.
    CPC ............... *B05B 9/043* (2013.01); *B05B 15/25* (2018.02); *G05B 2219/32082* (2013.01)

(56) References Cited

U.S. PATENT DOCUMENTS

| | | | | |
|---|---|---|---|---|
| 2003/0025763 | A1* | 2/2003 | Sturgeon | B41J 2/1752 347/49 |
| 2003/0037835 | A1* | 2/2003 | Hougland | B65D 77/065 141/10 |
| 2005/0057586 | A1* | 3/2005 | Brenner | B41J 2/17566 347/7 |
| 2008/0273069 | A1* | 11/2008 | Langford | B41J 2/17596 347/89 |
| 2010/0103233 | A1* | 4/2010 | Akatsuka | B41J 2/19 347/92 |
| 2010/0206603 | A1* | 8/2010 | Drane | H05K 5/03 174/66 |
| 2011/0013474 | A1* | 1/2011 | Ludwig | B01F 7/22 366/102 |
| 2015/0298152 | A1* | 10/2015 | Chen | B05B 15/58 118/620 |
| 2017/0210064 | A1* | 7/2017 | Aw | B33Y 30/00 |
| 2018/0030794 | A1* | 2/2018 | Ellis | E21B 21/01 |
| 2019/0048303 | A1* | 2/2019 | Maggiore | B67D 3/0012 |

OTHER PUBLICATIONS

PCT Written Opinion the International Searching Authority for PCT/US2019/024063, dated Aug. 27, 2019 (12 pages).

* cited by examiner

THREE DIMENSIONAL PRINTING SYSTEM ADAPTABLE TO VARYING RESIN TYPES

CROSS-REFERENCE TO RELATED APPLICATIONS

This non-provisional patent application claims priority to U.S. Provisional Application Ser. No. 62/649,019, Entitled "THREE DIMENSIONAL PRINTING SYSTEM ADAPTABLE TO VARYING RESIN TYPES" by Rodney Hill et al., filed on Mar. 28, 2018, incorporated herein by reference under the benefit of U.S.C. 119(e).

FIELD OF THE INVENTION

The present disclosure concerns a system for delivering a curable resin to a printhead. More particularly, the present disclosure concerns an apparatus and method that allows resin-carrying components to be quickly removed and replaced for maintenance or changing resins.

BACKGROUND

Three dimensional printing systems that utilize curable resins are in wide use. Such systems can utilize variety of resins such as photocurable liquids, resin binders, support material resins, and various treatment fluids. Challenges with such systems include reliability, maintenance, contamination, and a desire to utilize different and/or improved formulations. There is a need for a system that allows for maintenance or changing resins with minimal difficulty and no contamination.

SUMMARY

Figure 1:
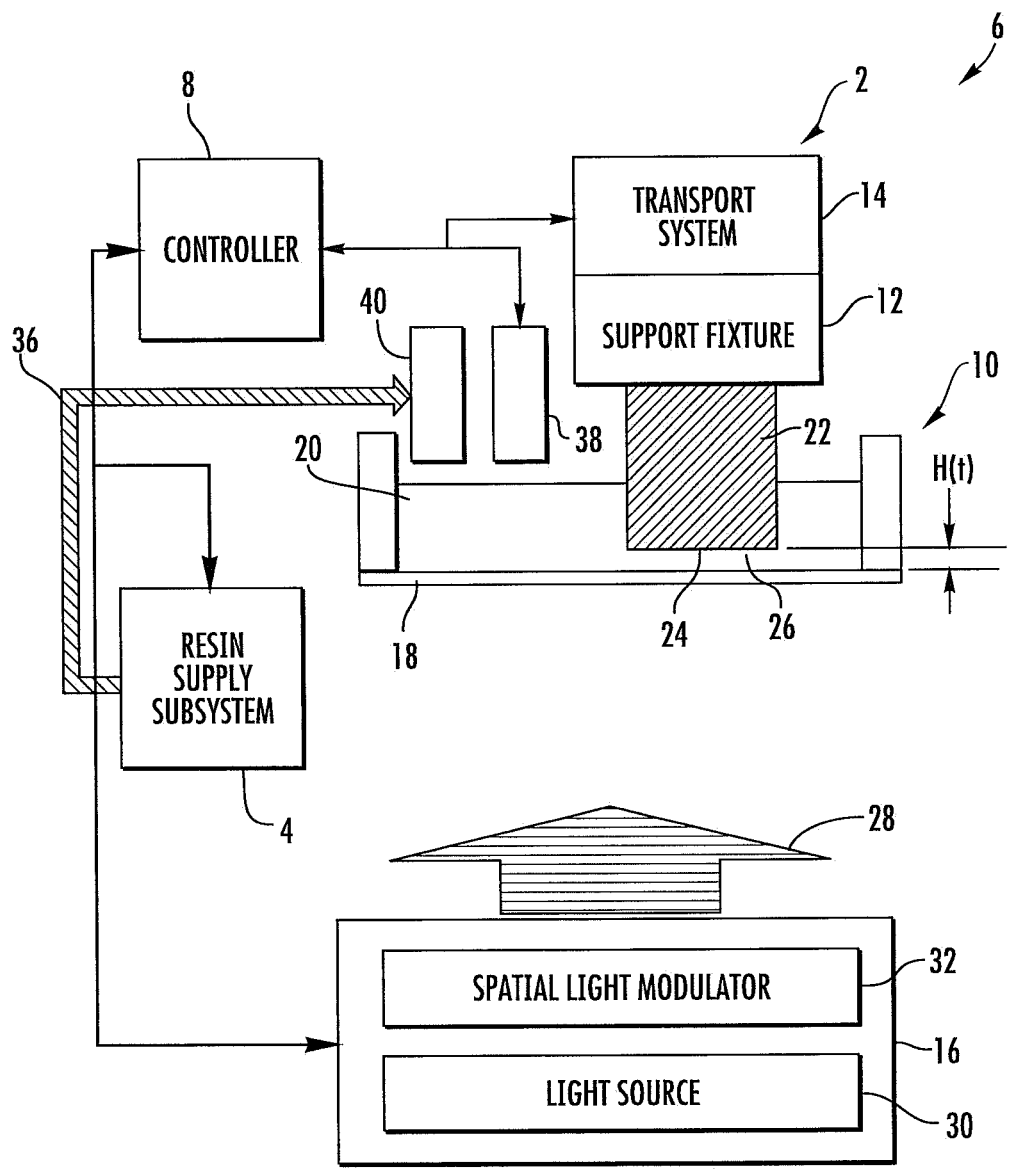
FIG. 1 is a block diagram schematic of an embodiment of a three dimensional printing system.

A first aspect of the disclosure is a method for changing resin in a three dimensional printing system from an old or first resin to a new or second resin. The printing system initially includes a print engine, receptacle, a used resin container installed in the receptacle, and a used conduit assembly fluidically coupling the used resin container to the print engine. The used resin container and the used conduit assembly contain the old or first resin. The method includes: (1) removing the used resin container from the receptacle, (2) disconnecting and removing the used conduit assembly from the printing system, (3) installing a new conduit assembly into the printing system, and (4) installing a new resin container into the receptacle. The new resin container contains the new or second resin. Step (4) couples the new resin container to the conduit assembly and to the print engine. The new resin container and the new conduit assembly together provide a sealed fluid path to the print engine to allow changing resins without contamination from the old resin. The conduit assembly includes a fluid inlet configured to be affixed in the receptacle in an upward orientation to receive a downwardly extending fluid outlet from the resin container, a pump head configured to be mounted to a pump motor system in the printing system, a first conduit coupling the fluid inlet to the pump head, a fluid outlet configured to supply resin to the print engine, and a second conduit coupling the pump head to the fluid outlet of the conduit assembly.

In one implementation the pump motor system includes a mounting surface and a motorized actuator extending therefrom. The pump head is a peristaltic pump head with a deformable tube between an outer housing and a rotary roller. The method includes mounting the outer housing to the mounting surface and the motorized actuator extends into and couples to the rotary roller. The pump motor system and the outer housing include complementary mounting features that are coupled to secure the outer housing to the mounting surface.

In another implementation the receptacle includes a lower interface portion with a latching door rotatably coupled to an interface chassis. The method includes securing the fluid inlet of the conduit assembly between the latching door and the interface chassis.

In yet another implementation the method includes installing a clean resin vessel into the print engine. The clean resin vessel is open on an upper side. Installing the conduit includes positioning the fluid outlet of the conduit above a portion of the open resin vessel. The method also includes operating the pump motor system to pump new resin from the new resin container to the resin vessel to prepare for a three dimensional printing operation. The print engine includes a liquid level sensor proximate to the resin vessel. The method further includes sensing a liquid level and halting operation of the pump motor system in response to sensing a threshold liquid level.

In a further implementation the receptacle includes an upwardly extending electrical connector. The resin container include a downwardly extending electrical connector coupled to an information storage device. Installing the resin container into the receptacle couples the information storage device to the printing system.

A second aspect of the disclosure is a kit for changing a three dimensional printer from a first (old) resin to a second (new) resin. The three dimensional printer includes a print engine and a receptacle. The kit includes a conduit assembly and a resin container. The conduit assembly includes a fluid inlet configured to be affixed in the receptacle in an upward orientation, a pump head configured to be coupled to a motorized pump actuator in the receptacle, a first conduit coupling the fluid inlet to the pump head, a fluid outlet configured to supply resin to the print engine, and a second conduit coupling the pump head to the fluid outlet.

In one implementation the fluid inlet of the conduit assembly includes an outer jacket with a downwardly tapering profile and it can therefore be securely latched into the receptacle.

In another implementation the pump head is a peristaltic pump head including a deformable tube positioned between an outer housing and a rotary roller, the rotary roller couples to the motorized pump actuator when the conduit assembly is installed into the printer.

In yet another implementation the fluid outlet of the conduit assembly includes a mount for coupling the fluid outlet above an open resin vessel in the print engine.

In a further implementation the receptacle includes a lower interface portion that supports the fluid inlet of the conduit assembly and a motorized actuator. The resin container includes a gear coupled to an impeller. Installing the resin container into the receptacle couples the motorized actuator to the gear to provide motorized stirring of resin within the resin container.

DETAILED DESCRIPTION OF THE PREFERRED EMBODIMENTS

FIG. 1 is a block diagram schematic of an embodiment of a three dimensional printing system 2 that includes a resin supply subsystem 4 providing resin to a print engine 6 under control of controller 8. In describing printing system 2 axes X, Y, and Z are used to illustrate positions, directions, and motions. Axes X, Y, and Z are mutually orthogonal. Axes X and Y are "lateral" or "horizontal" axes. Axis Z is a "vertical" axis. Axis Z is typically aligned or nearly aligned with a gravitational reference.

The print engine 6 includes a resin vessel 10, a support fixture 12 coupled to a motorized transport system 14, and a light engine 16. The resin vessel 10 includes a transparent sheet 18 on a lower side and contains a photocurable resin 20. The support fixture 12 supports a three dimensional article 22 having a lower face 24 in facing relation with the transparent sheet 18. Between the transparent sheet 18 and lower face 24 is a thin layer of the resin 20 defining a build plane 26 that is proximate to the lower face 24.

The transport system 14 is configured to vertically position the support fixture 12. The transport system 14 is thereby configured to control an optimal distance H(t) between the transparent sheet 18 and the lower face 24 during the manufacture of the three dimensional article 22.

The light engine 16 generates and projects pixelated light 28 up through the transparent sheet and to the build plane 26. The application of the pixelated light 28 selectively hardens a layer of the resin 20 at the build plane 26 and onto the lower face 24. In the illustrated embodiment, the light engine 16 includes a light source 30 and a spatial light modulator 32.

The resin supply subsystem 4 includes a conduit assembly 36 and a resin level sensor 38. The conduit assembly 36 includes a fluid outlet 40 positioned above the resin vessel 20. Resin 20 is transported through conduit assembly 36 and then dispensed into resin vessel 10.

Controller 8 is configured to receive signals from sensors such as resin level sensor 38 and to control transport system 14, light engine 16, resin supply subsystem 4, and other portions of the printing system 2. The controller 8 can have one location or multiple locations within the printing system 2. The controller 8 includes a processor coupled to an information storage device. The information storage device includes a non-transient or a non-volatile media storing software instructions. The software instructions are executed by the processor to read signals from sensors and to operate portions of the printing system 2.

While a particular embodiment of the print engine 6 is depicted in FIG. 1, variations are possible. In one alternative embodiment, the print engine 6 is a stereolithography print engine with lasers that cure top layers of a three dimensional article as it is being lowered into a tank of resin. In another alternative, the print engine 6 utilizes an piezoelectric printer to selectively dispense layers of a photocurable resin onto a three dimensional article.

Figure 2:
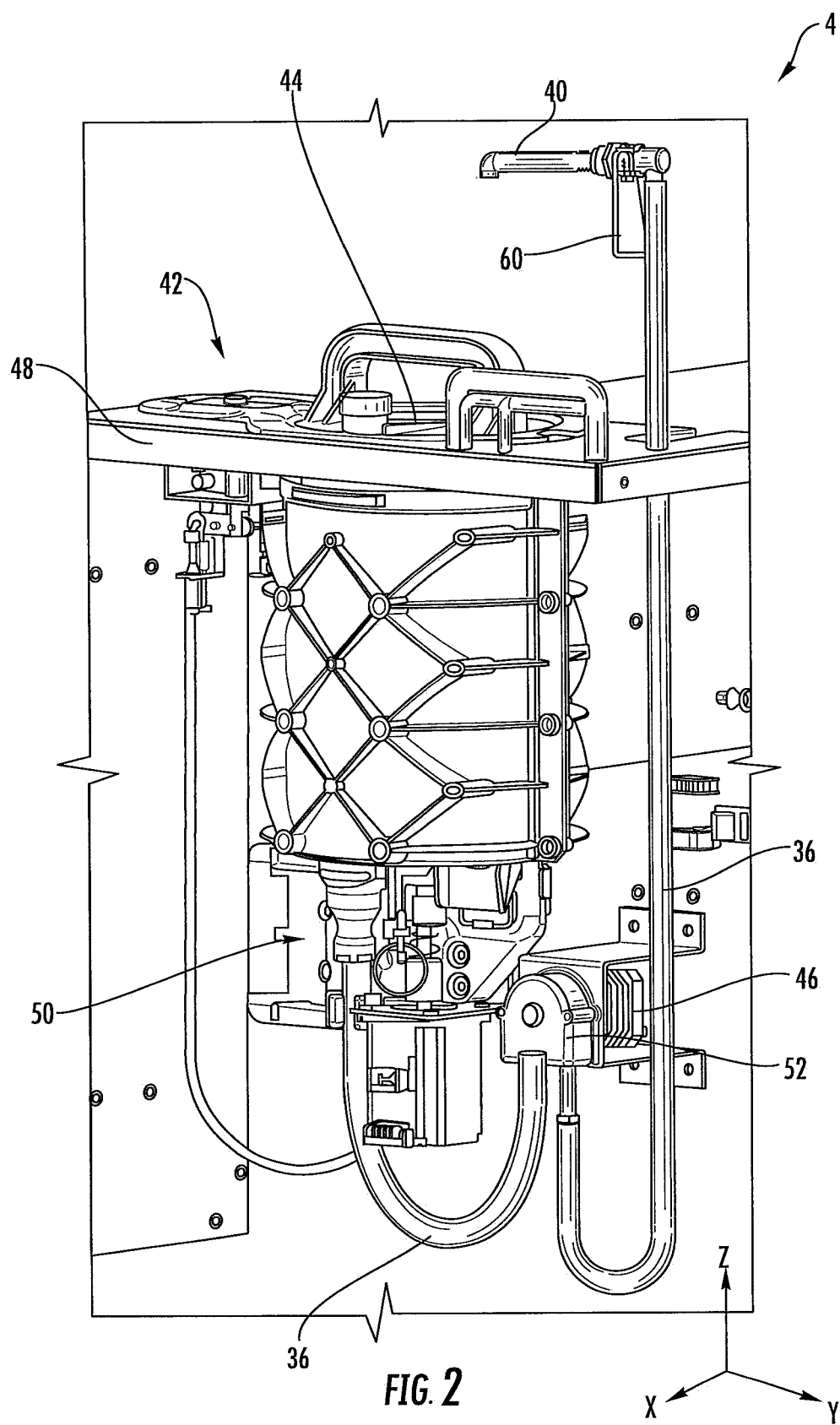
FIG. 2 is an isometric view of a of a resin supply subsystem which includes a receptacle, a resin container installed into the receptacle, and a conduit assembly.

FIG. 2 is an isometric view of an embodiment of a resin supply subsystem 4 for supplying the resin 20 to the print engine 6. The resin supply subsystem 4 includes a receptacle 42, a resin container 44, the conduit assembly 36, and pump motor system 46.

The receptacle 42 is configured to receive, align, and couple to the resin container 44. The receptacle 42 includes an upper portion 48 and an interface portion 50 which will be discussed in more detail infra. At the interface portion 50, the resin container 44 is fluidically coupled to the conduit assembly 36.

The conduit assembly 36 includes a pump head 52 that is mechanically coupled to the pump motor system 46. In response to an operation of the pump motor system 46, resin flows out of the resin container 44, through the conduit assembly 36, and to the print engine 6.

Conduit assembly 36 and resin container 44 are easily removed and replaced from the printing system 2. This allows the printing system 2 to be changed from a first (old) resin to a second (new) resin with minimal difficulty by removing and replacing resin container 44, conduit assembly 36, and the resin vessel 10. Because no other portion of printing system 2 is contacted by resin, contamination of the second resin by the first resin is avoided while allowing a very rapid changeover. The conduit assembly 36 and resin container 44 can be provided together as a kit for quickly changing out resin from a previous version of resin to that contained within resin container 44.

Figure 3:
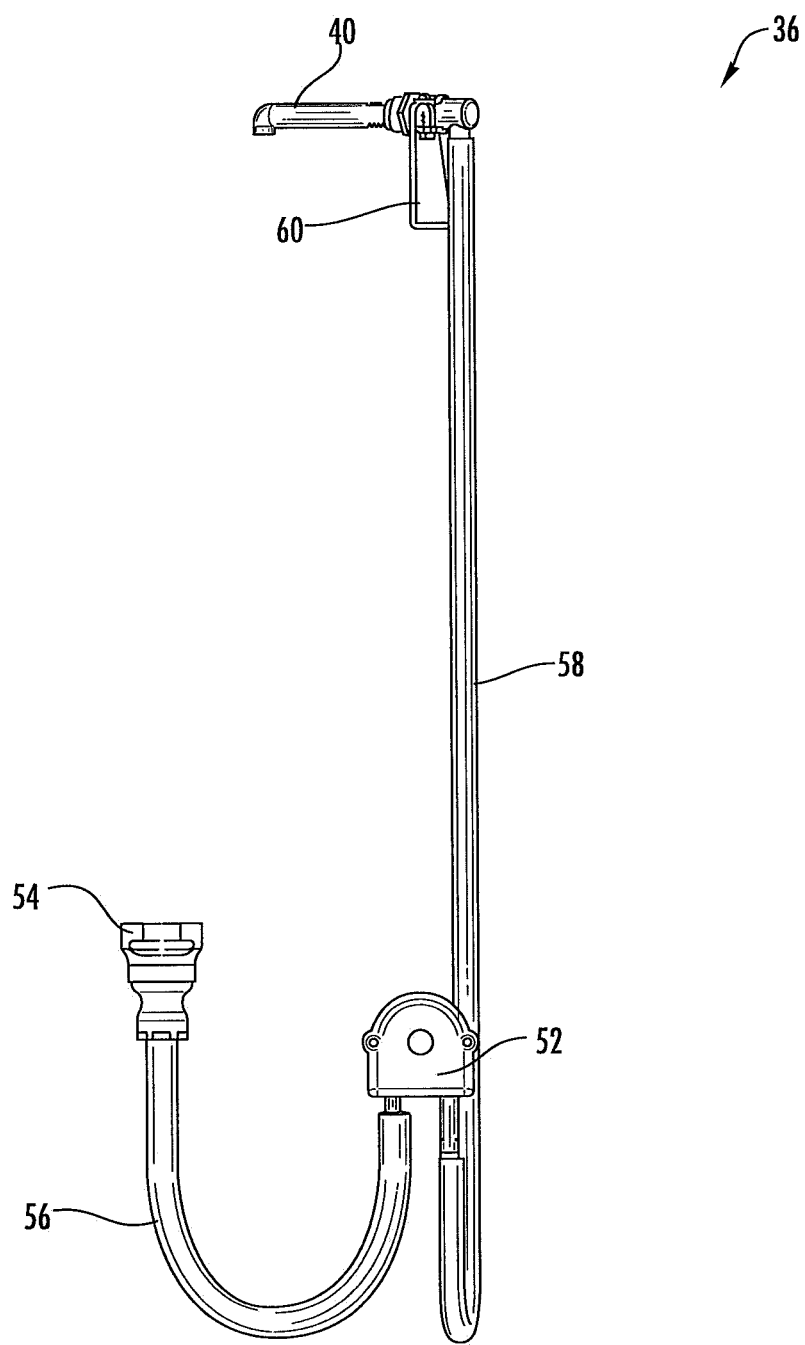
FIG. 3 is an isometric view of an embodiment of a replaceable conduit assembly.

FIG. 3 is an isometric view of an embodiment of a replaceable conduit assembly 36 in isolation. Conduit assembly 36 includes fluid inlet 54, first conduit 56, pump head 52, second conduit 58, and fluid outlet 40. In the illustrated embodiment, the fluid outlet 40 includes a mounting feature 60 for quickly mounting the fluid outlet 40 above the resin vessel 10. In the discussion infra, further details are provided for the way the conduit assembly can be quickly removed and replaced from the printing system 2.

Figure 4A:
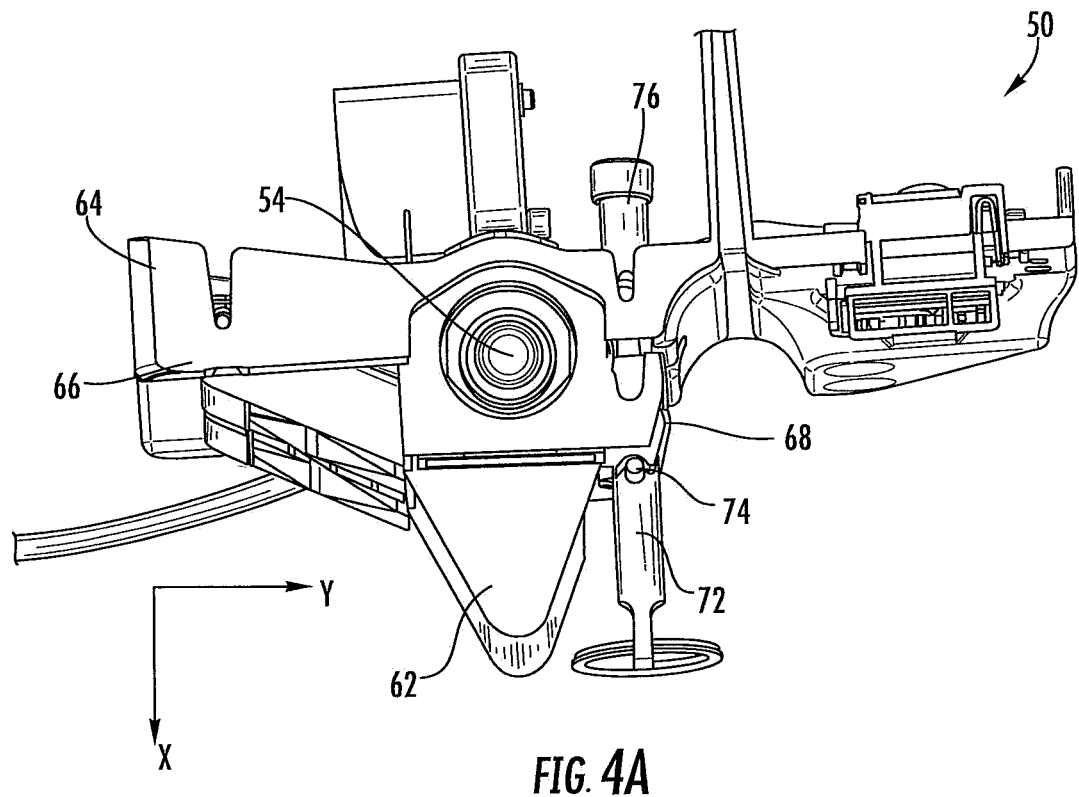
FIG. 4A is a top view of an embodiment of an interface portion of a receptacle. The interface portion includes a latching door that secures a fluid inlet in a latched configuration. The latching door is held in a closed position by a latch having a pin extending therefrom. A spring force on the latch urges a latch pin against a detent in the door which maintains the door in the closed or latched configuration.
Figure 4B:
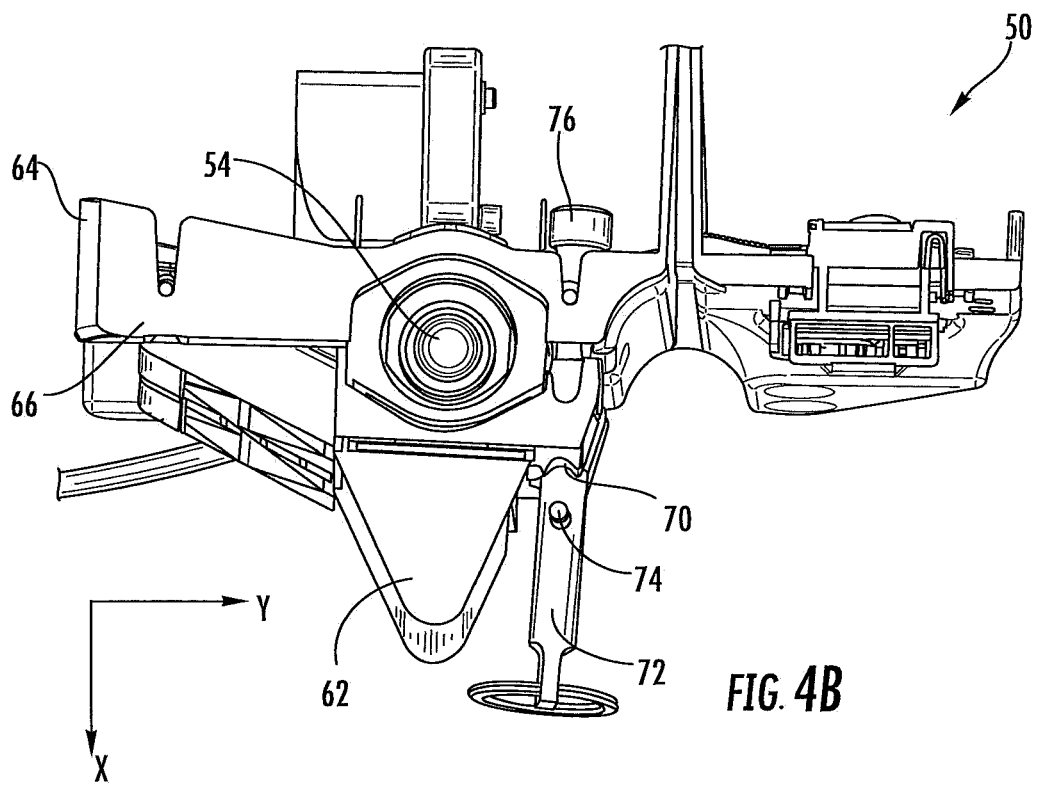
FIG. 4B is similar to FIG. 4A except that the latch is being pulled outwardly and the latch pin has been displaced away from the detent.

FIGS. 4A-D are top views illustrating an unlatching sequence of the fluid inlet 54 of the conduit assembly 36 from the interface portion 50 of receptacle 42. FIG. 4A depicts a latching door 62 in a latched state. The fluid inlet 54 is secured between the latching door 62 and an interface chassis 64. The latching door 62 is attached at one end to a door hinge 66 which defines a vertical axis 66 about which the door hinge 66 rotates. The latching door 62 has a free end 68 that rotates about door hinge 66 and includes a detent 70 (FIG. 4B). A spring loaded latch 72 includes a pin 74 that is urged against (and seated in) the detent 70 by a spring 76. The action of pin 74 against and within detent 70 thereby secures the door 62 in the latched state. In the illustrated embodiment there can be two pins 74 that extend vertically in the plus and minus Z direction from the latch 72. The pin or pins 74 exert a lateral seating force on the detent in a −X direction.

FIG. 4B depicts the latch 72 being pulled and extended against the spring 76 so that the pin 74 is no longer seated in the detent 70. The latch 72 is being pulled and extended laterally in the +X direction. This extension unseats the pin 74 from the detent 70.

Figure 4C:
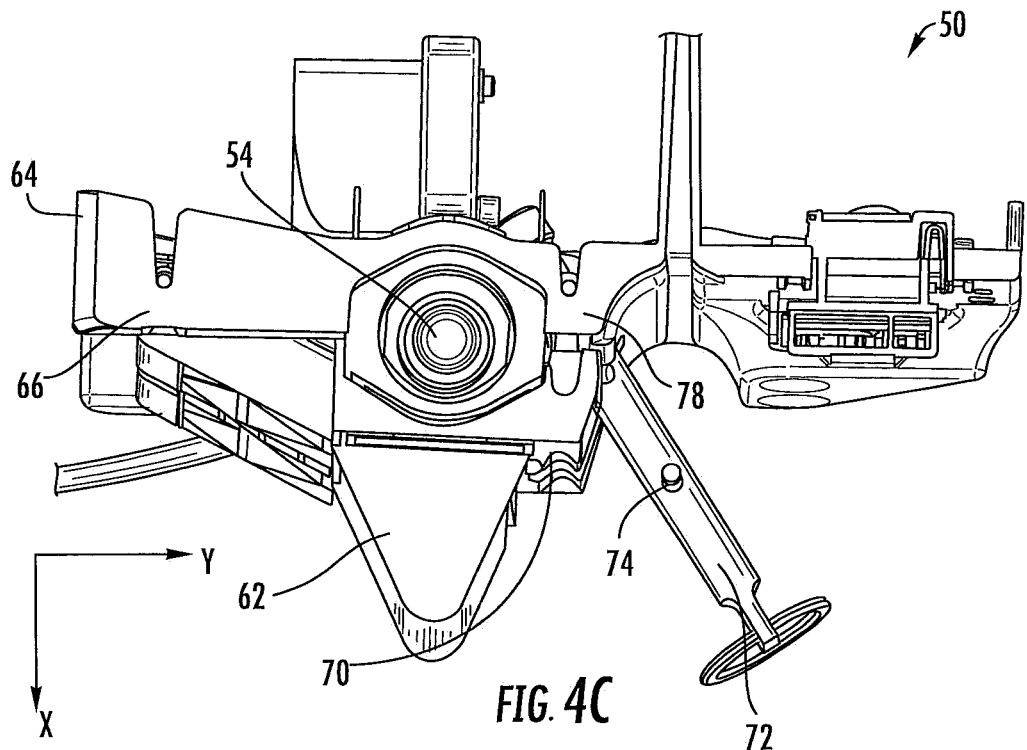
FIG. 4C is similar to FIG. 4B except that the latch has been rotated away from a free end of the latch door.

See FIG. 4C. The latch 72 is mounted to the interface chassis at a latch hinge 78. The latch 72 rotates about a vertical axis defined by the latch hinge 78. The latch 72 is being rotated outwardly away from the free end 68 of the latching door 62 about the latch hinge 78. With the depicted rotation, the pin 74 will not interfere with outward rotation of the latching door 62.

Figure 4D:
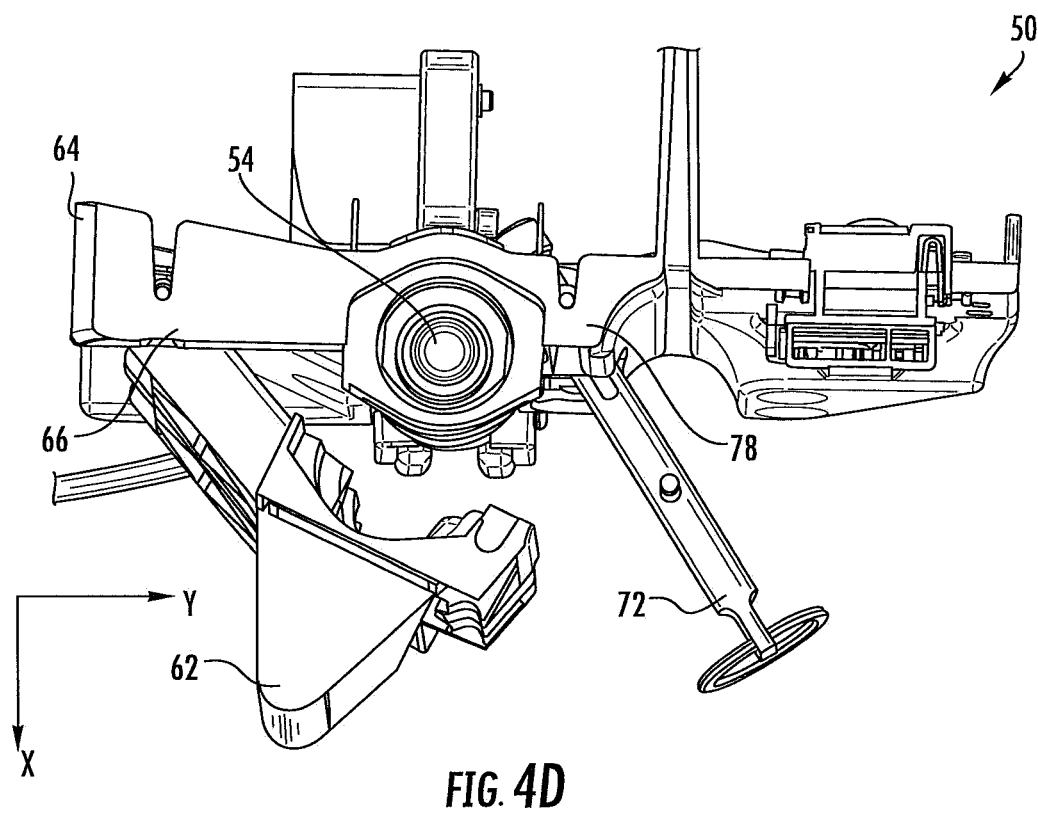
FIG. 4D is similar to FIG. 4C except that the latch door has been rotated outwardly to allow the fluid inlet of the conduit assembly to be removed from the interface portion.

FIG. 4D depicts the latching door 62 in an opened state to allow fluid inlet 54 to be removed from the interface portion 50 and replaced. Then the latching door can 62 be returned to the latched state by following a reverse order for the steps just described: (1) the latching door 62 is rotated inwardly around the door hinge 66 (FIG. 4D to FIG. 4C); (2) the latch 72 is rotated around the latch hinge 78 until pin 74 is in alignment with the detent 70 (FIG. 4C to FIG. 4B); (3) the spring 76 is allowed to retract the latch inwardly in the −X direction until the pin 74 rests in detent 70 (FIG. 4B to FIG. 4A).

Figure 5A:
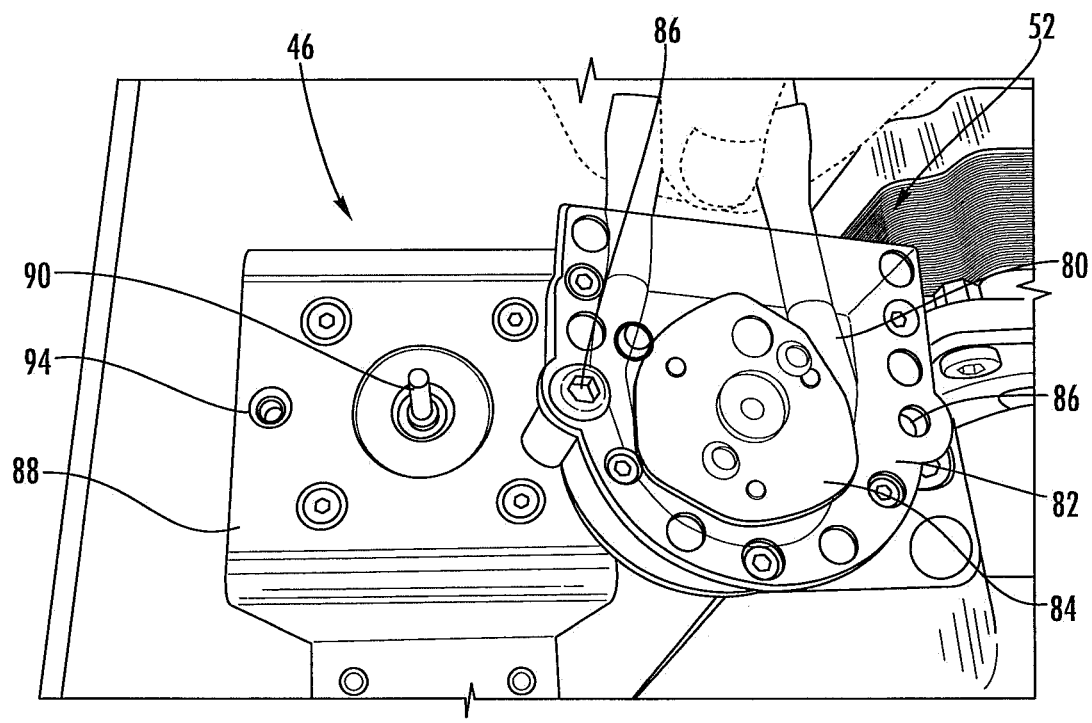
FIG. 5A is an isometric view of an embodiment of a pump head about to be mounted to a pump motor system.
Figure 5B:
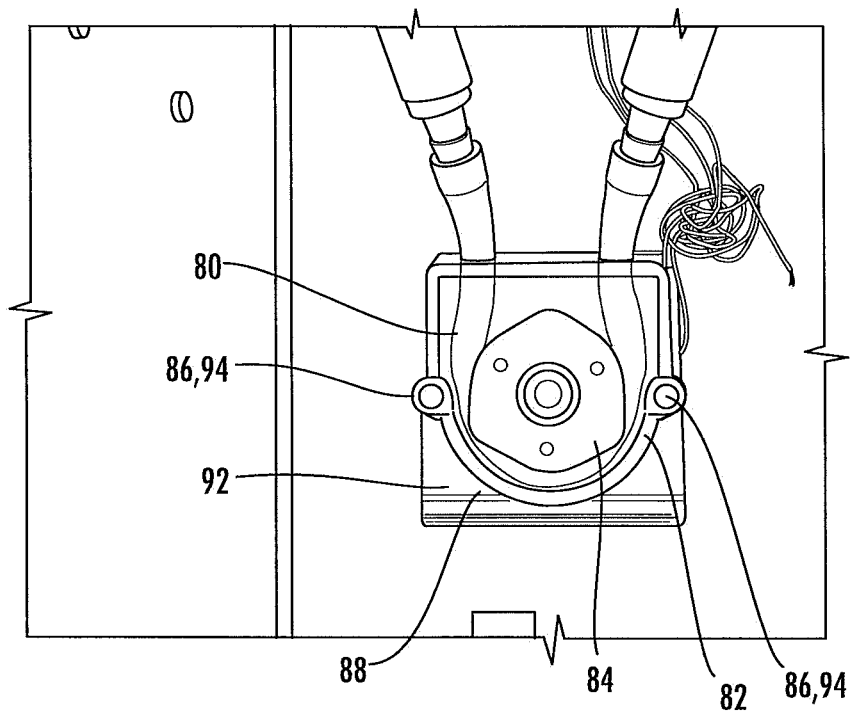
FIG. 5B is an isometric view of an embodiment of the pump head mounted to the pump motor system.

FIGS. 5A and 5B are isometric drawings depicting the mounting of a pump head 52 to the pump motor system 46. The pump head 52 is a peristaltic pump head 52 with a deformable tube 80 between an outer housing 82 and a rotary roller 84. The outer housing 82 includes a plurality of mounting features 86 for mounting the pump head to the pump motor system 46.

The pump motor system 46 includes a mounting surface 88, a pump actuator 90, and a pump motor 92 (under the mounting surface 88). The pump motor 92 is coupled to the pump actuator 90. The mounting surface 88 includes a plurality of mounting features 94.

Mounting or coupling the pump head 52 to the pump motor system 46 is a very quick process. First, the pump head 52 is placed against the mounting surface 88 and the pump actuator 90 engages the rotary roller 84. Second, the complementary mounting features (86 and 94) are coupled together. In one embodiment, the mounting features (86 and 94) are aligned holes and include hand assembled thumb screws that pass through the aligned holes and secure the outer housing 82 to the mounting surface 88. In another embodiment, the complementary mounting features (86 and 94) are magnetic materials that mutually attract each other. In yet another embodiment, the complementary mounting features (86 and 94) include combinations of pins and openings that are press fit together to provide a friction-based mounting. In a further embodiment, the complementary mounting features (86 and 94) include a combination of wrench-adjustable screws and threaded holes. These are but a few examples.

With the pump head 52 mounted to the pump motor system 46, the pump motor 92 can now controllably rotate the rotary roller 84. Rotation of the rotary roller 84 progressively squeezes the tube 80 to impart fluid motion according to the direction of the rotation.

Figure 6:
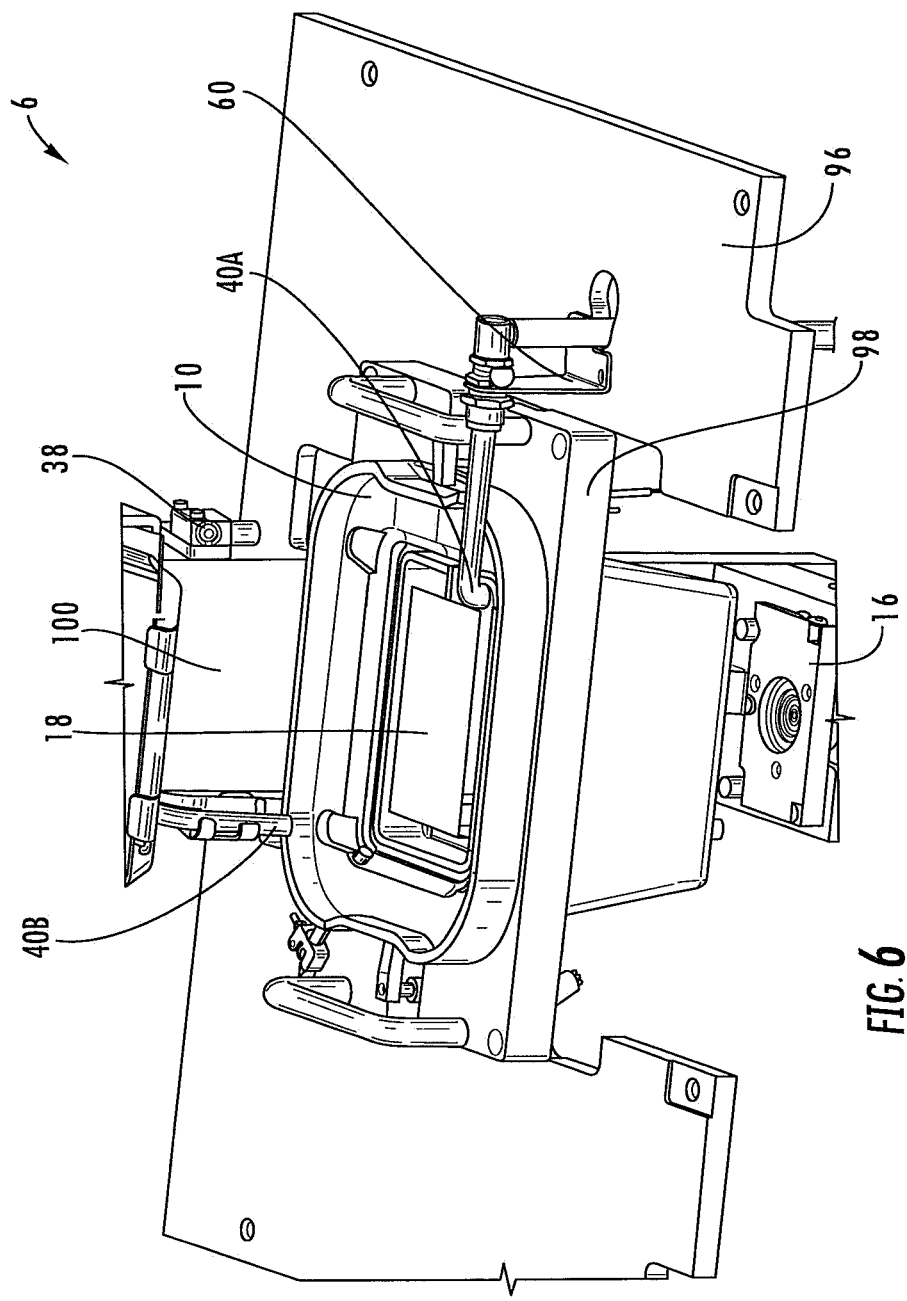
FIG. 6 is an isometric view of an embodiment of a print engine and a conduit assembly fluid outlet. Two alternative mounting locations of the fluid outlet are shown for dispensing resin into a resin vessel.

FIG. 6 is an isometric view of a portion of an embodiment of the print engine 6 illustrating ways in which the conduit assembly 36 provides photocurable resin 20 to the resin vessel 10. The mounting feature 60 is shown mounted to a support 96 proximate to a support plate 98 that supports the resin vessel 10. The conduit assembly fluid outlet 40 (40A in FIG. 6) is disposed above a portion of the resin vessel. The mounting feature 60 and support 96 can include complementary mounting features such as screws, thumbscrews, magnets, compressible pins, or other means for quickly mounting the fluid outlet 40 to dispense or delivery resin to the resin vessel 10.

In another embodiment, the mounting feature 60 can be mounted to the support plate 98. In yet another embodiment, the fluid outlet 40 can be supported proximate to a main support 100 which supports the support plate 98 (see element 40B near the main support 100). In one embodiment a support is provided for both the fluid outlet 40B and a non-contact sensor 38.

Figure 7A:
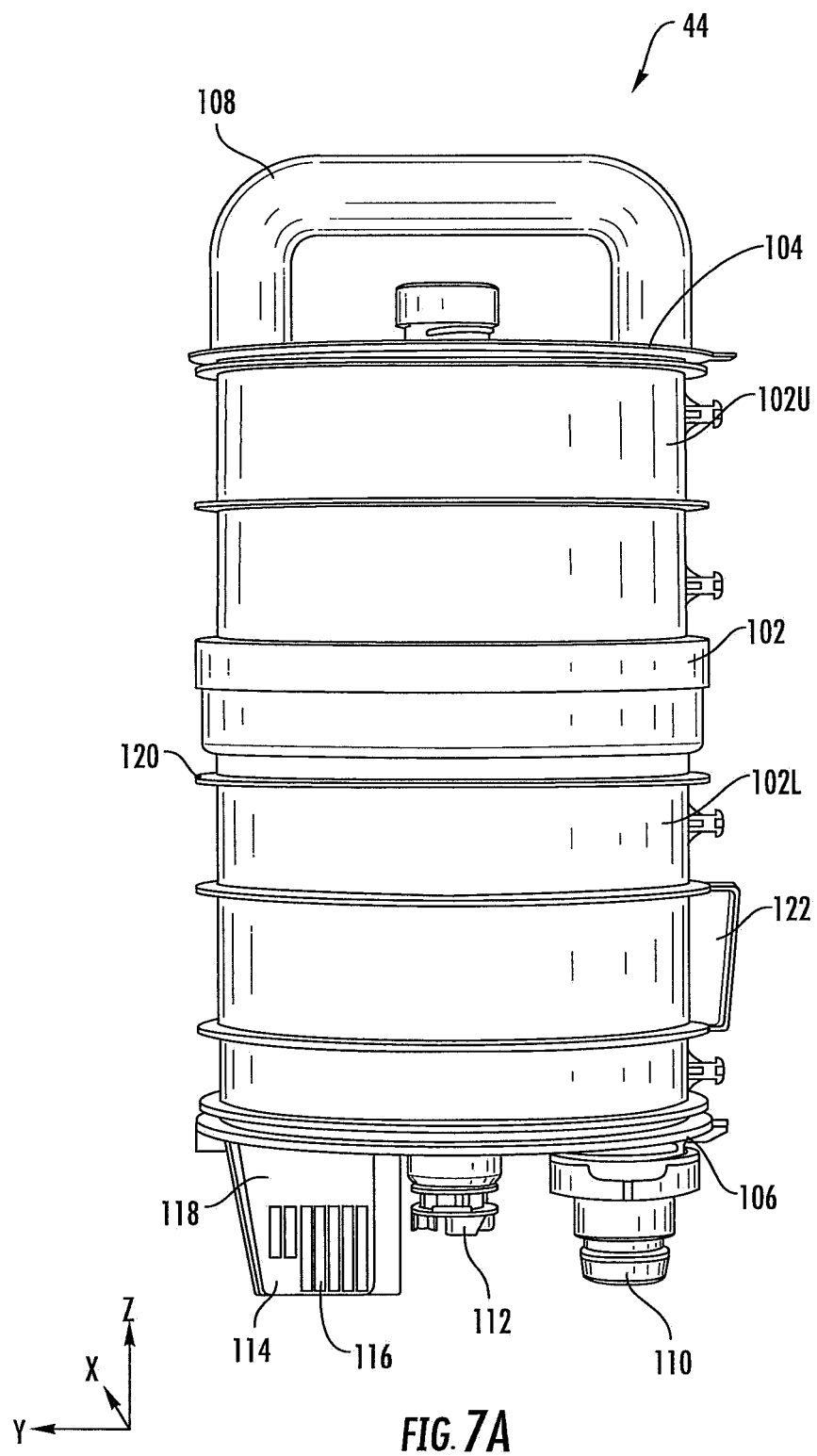
FIG. 7A is a side view of an embodiment of a resin container.

FIGS. 7A-E depict an embodiment of resin container 44 in more detail. FIG. 7A depicts a side view of resin container 44 without an outer shell (to be illustrated infra). Resin container 44 includes a housing 102 which includes an upper housing portion 102U and a lower housing portion 102L. Resin container 44 has a trailing end 104 and a leading end 106 relative to a direction (vertically downward or −Z) of installation into the receptacle 42. Extending upwardly from the trailing end 104 is a handle 108 for hand-manipulating the resin container 44 down into and up out of the receptacle 42.

Extending downwardly from the leading end 106 is a fluid outlet 110, a gear 112, and an electrical connector 114. The electrical connector includes a plurality of contact pads 116 that are electrically coupled to an information storage device 118.

The outer housing 102 includes a plurality of ribs 120 that provide structural reinforcement and rigidity for the outer housing 102. Also extending from an outside surface of housing 102 is an aligning feature or rib 122 for aligning the resin container 44 into the receptacle 42.

Figure 7B:
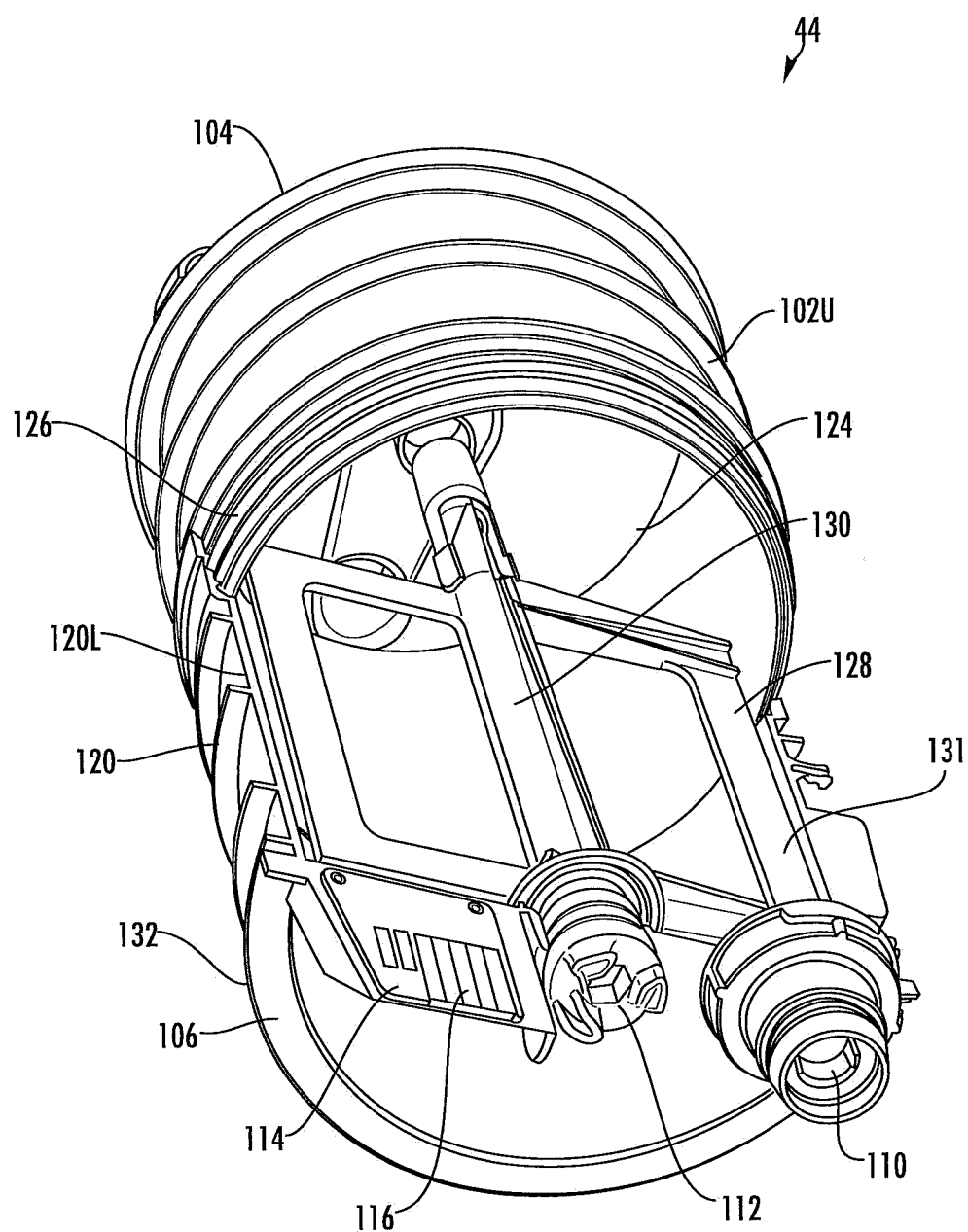
FIG. 7B is an isometric view of an embodiment of a resin container. This includes a cutaway view with a portion of a lower housing cut away to illustrate internal components of the resin container.

FIG. 7B is an isometric illustration of the resin container 44 which provides a cutaway view of the lower housing 102L in order to illustrate certain internal components. The upper housing 102U and lower housing 102L assemble to define an internal reservoir 124 within for containing the resin 20. An O-ring 126 provides a seal between an outside cylindrical surface of the upper housing 102U and an inside cylindrical surface of the lower housing 102L.

Disposed within the internal reservoir 124 is an impeller 128 for stirring the resin 20. The impeller 128 is coupled to the gear 112 and turns about a vertical axial shaft 130 that is supported by and rotatably mounted to the trailing 104 and leading 106 ends of the housing 102. The impeller 128 includes at least two blades 131 that extend radially from the axial shaft 130. The blades 131 rotate about a vertical axis of rotation defined by the axial shaft 130.

The fluid outlet 110, the gear 112, and the electrical connector 114 are arranged along the lateral axis Y. The planar arrangement of contact pads 116 are arranged along the lateral axis Y so that they face in a lateral direction –X that is perpendicular to Y. See FIGS. 7A and 7C concerning the axes. In the illustrated embodiment, the gear 112 is positioned centrally relative to the leading end 106 and is centered on the axial shaft 130. The fluid outlet 110 is positioned between the gear 112 and a peripheral edge 132 of the leading end 106. The electrical connector 114 is also positioned between the gear 112 and the peripheral edge 132 at an opposing position relative to the fluid outlet 110.

Figure 7C:
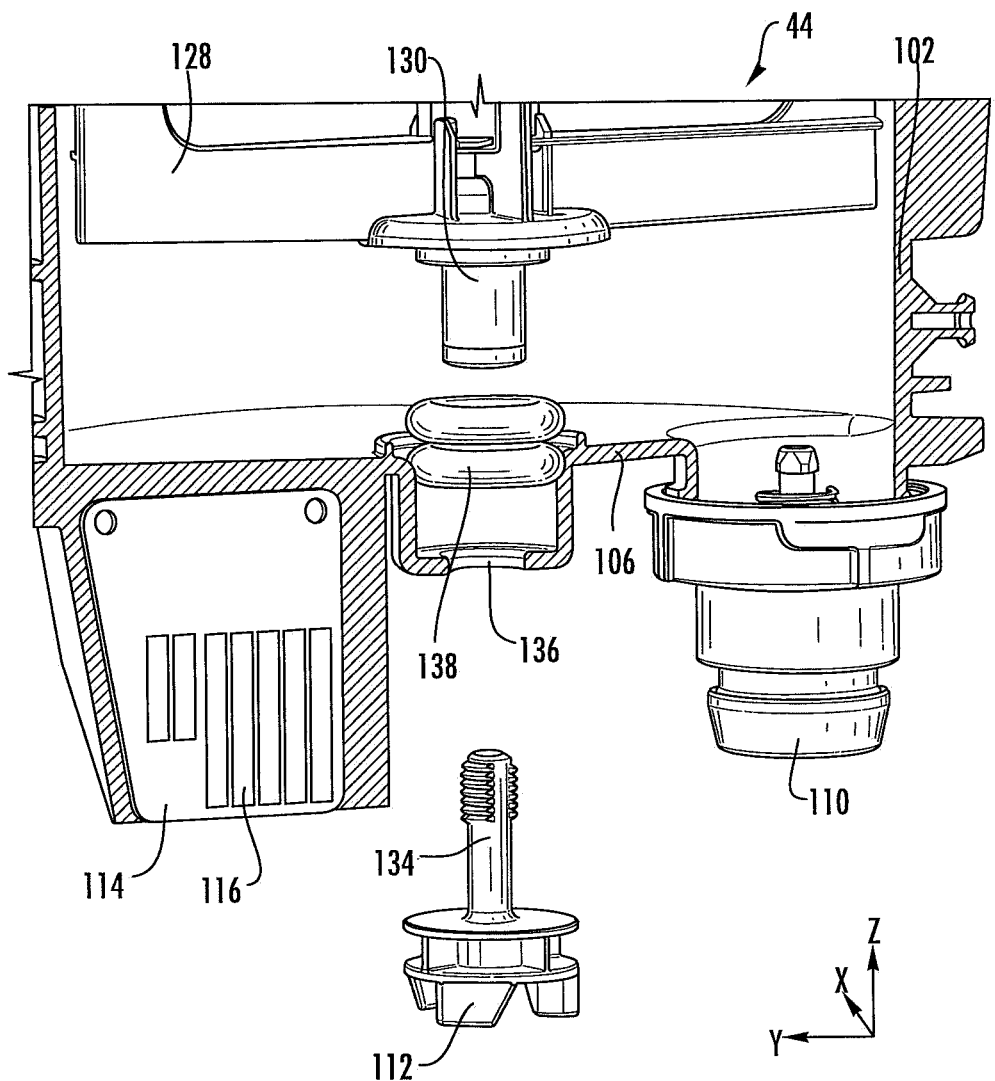
FIG. 7C is a close up side cutaway view of an embodiment of a resin container with just a leading end visible.

FIG. 7C is a close-up view of the leading end 106 of the resin container 44. The gear 112 is shown disconnected from the impeller 128. The gear 112 includes an upwardly extending threaded shaft 134 for coupling to the vertical shaft 130. When assembled, the shaft 134 passes through opening 136 in leading end 106 and is sealed to the leading end 106 by O-ring seals 138. The shafts 130 and 134 are axially aligned and define a vertical central axis for the resin container 44.

In FIG. 7B the resin container 44 is illustrated as having a circular lateral cross section with a centrally located gear 112 that is axially aligned with the impeller 128. In one alternative embodiment, the gear 112 can be off-center and coupled to the impeller 128 by a gear train including one or more additional gears. In another alternative embodiment, the resin container 44 can have an elongate lateral cross section (such as a rounded rectangle) and include plurality of impellers 128 that have separate gears 112 that are off-center. In yet another alternative embodiment the resin container 44 can include a plurality of impellers 128 that are coupled together as a gear train and coupled to a single gear 112.

Figures 7D, 7E:
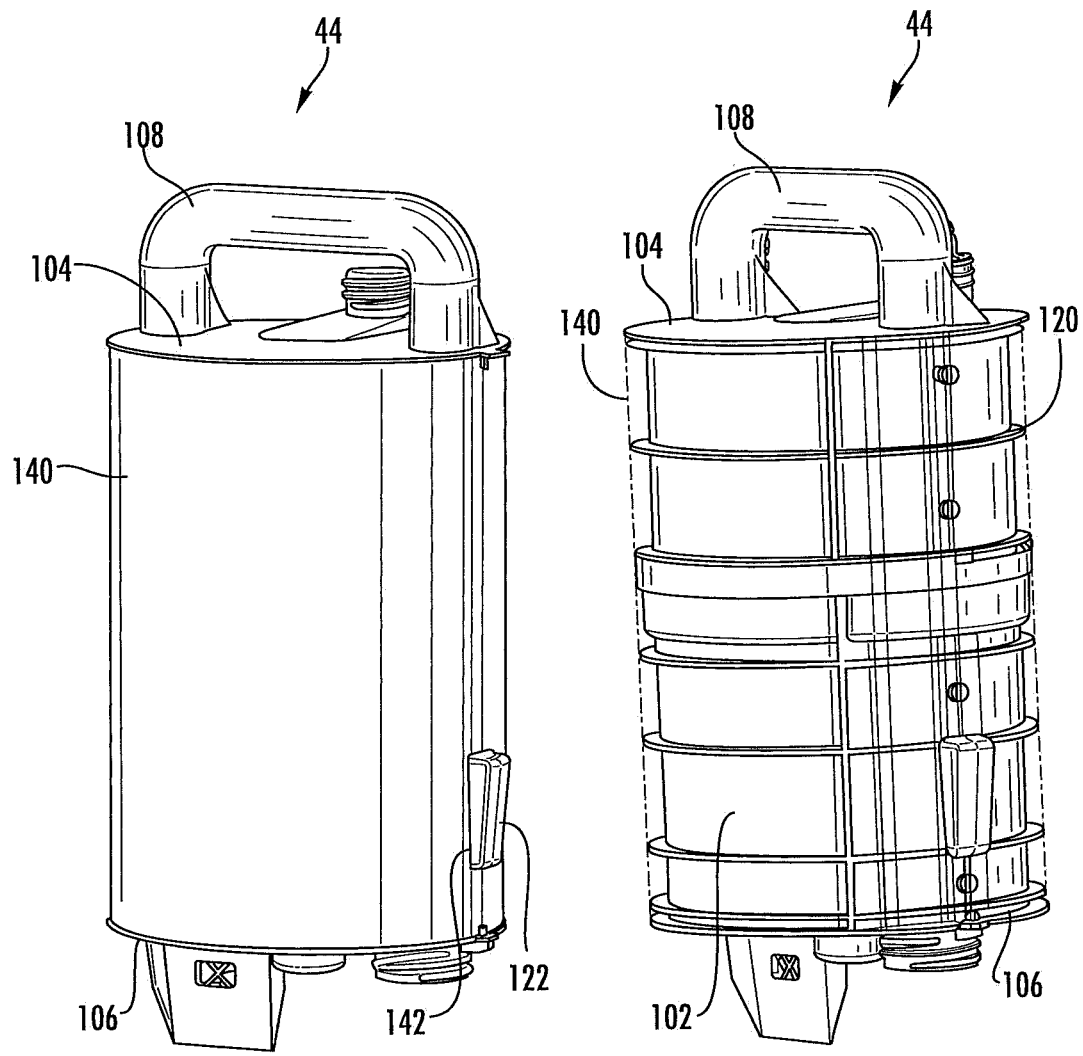
FIG. 7D is a side view of an embodiment of a resin container which includes an outer shell.
FIG. 7E is a side view of an embodiment of a resin container which illustrates how an outer shell covers features of a housing.

FIGS. 7D and 7E depict the resin container 44 with an outer shell 140 (shown in ghost in FIG. 7E) that closely covers the support ribs 120. Extending through an opening 142 in the shell 140 is the aligning feature 122.

Figure 8A:
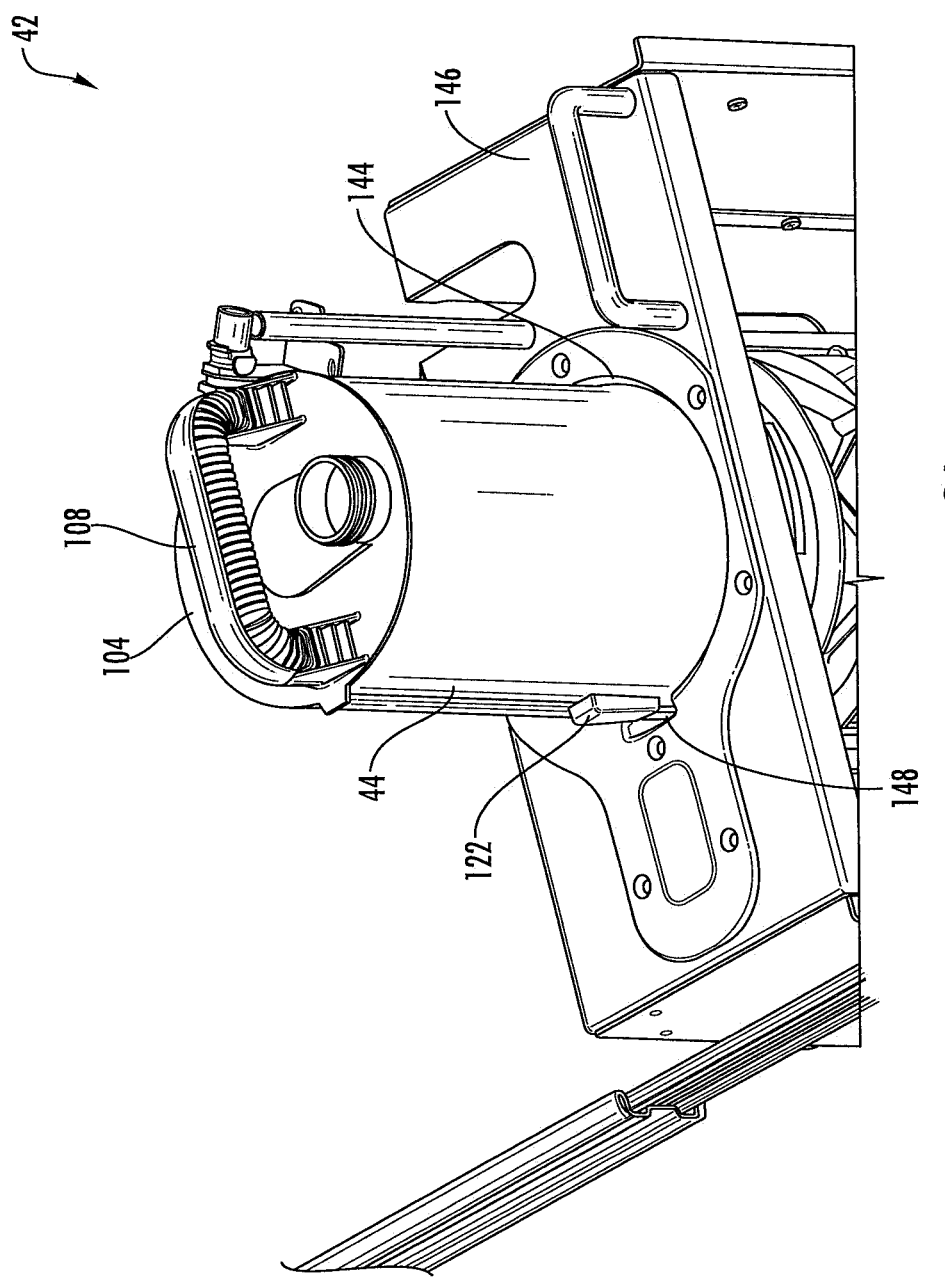
FIG. 8A is an isometric view of an embodiment of a resin container being inserted into an opening in an upper portion of a receptacle.
Figure 8B:
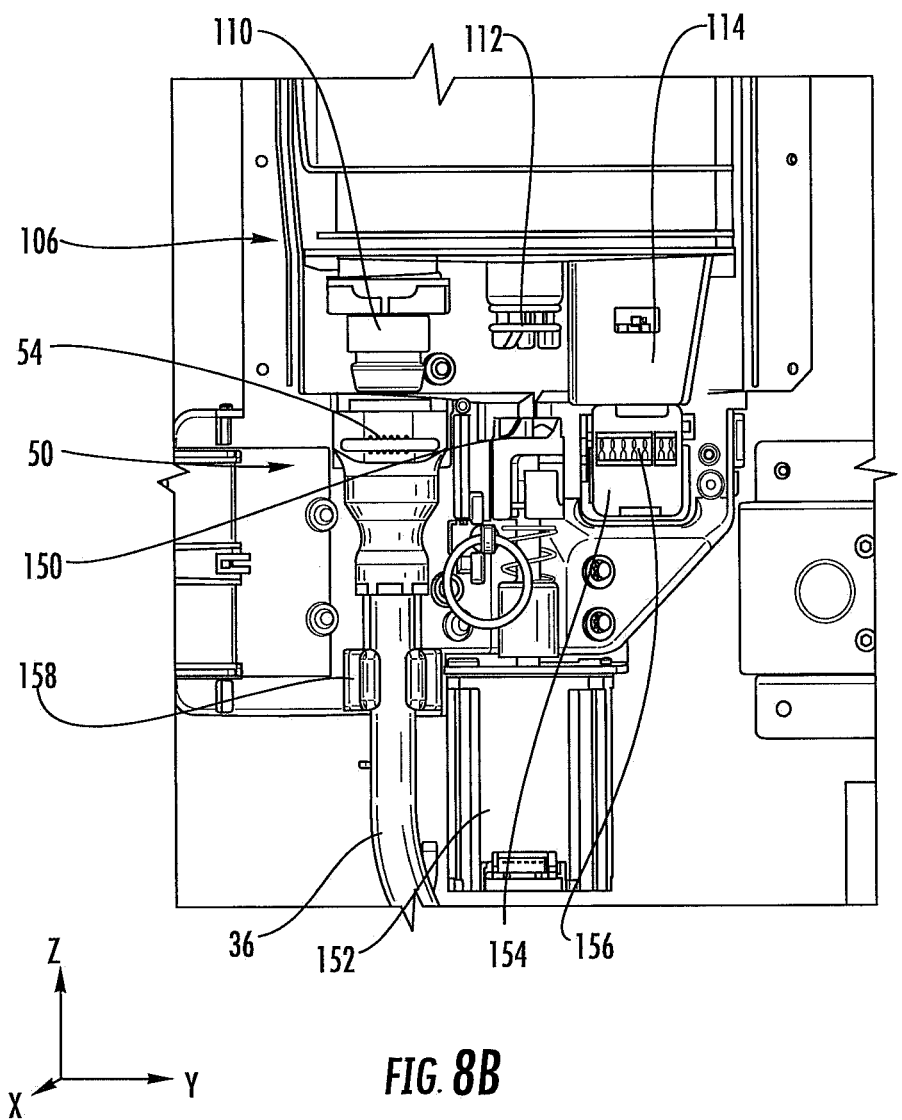
FIG. 8B is a side view of an embodiment of a resin container about to be coupled to an interface portion.
Figure 8C:
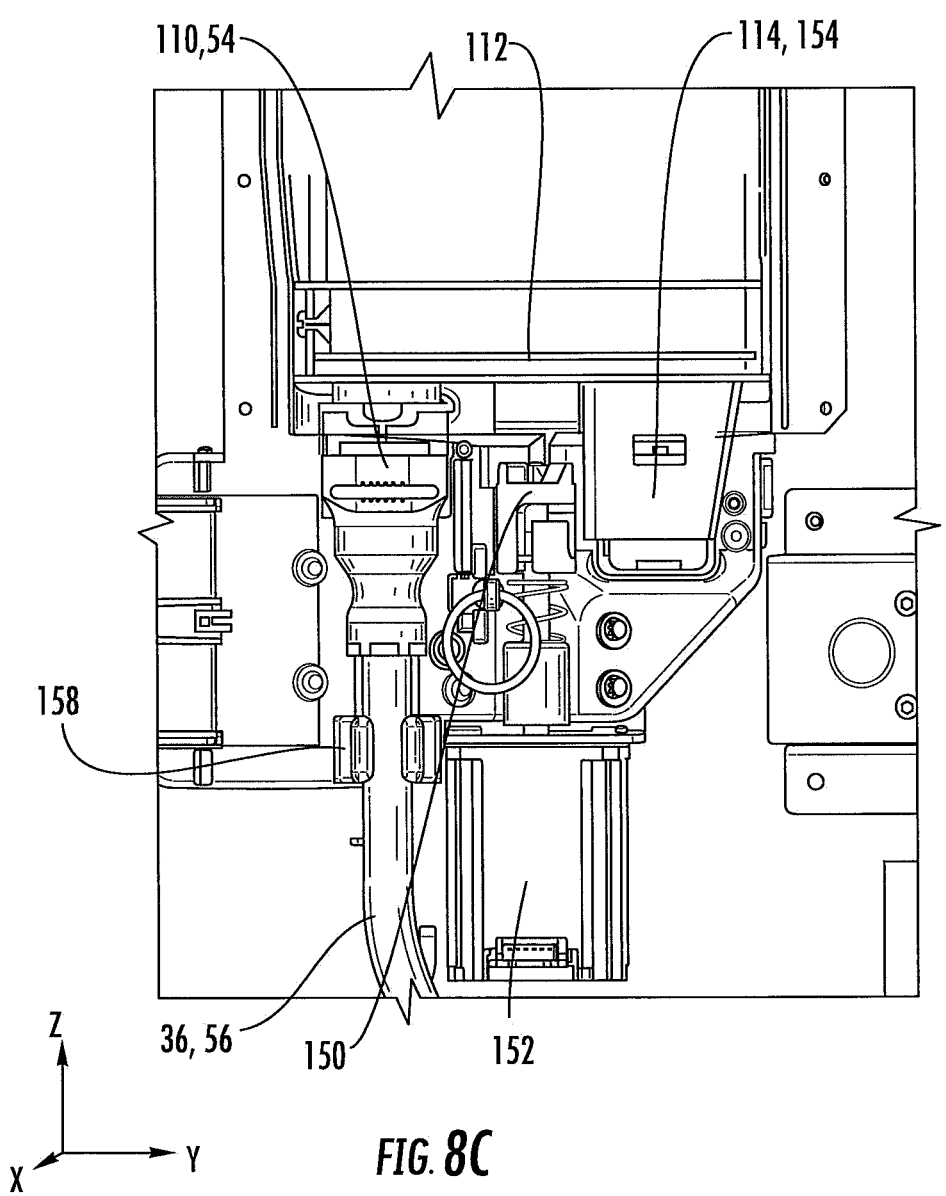
FIG. 8C is a side view of an embodiment of the resin container coupled to the interface portion.

FIGS. 8A-C depict an embodiment of a progression of the resin container 44 being installed in the receptacle 42. FIG. 8A is an isometric view depicting the resin container 44 being initially inserted into an opening 144 in an upper portion 146 of the receptacle 42. The opening 144 is complementary to an outside vertical surface of the resin container 44. The opening includes a slot 148 that needs to be aligned with the aligning feature 122 for the resin container to be installed. The slot 148 assures that the resin container 44 is installed in a proper orientation with respect to the vertical axis Z and aligned in X and Y.

FIG. 8B depicts the leading end 106 of resin container 44 about to connect with the lower interface portion 50 of the receptacle 42. The lower interface portion 50 includes the following features: (1) Fluid inlet 54 of the conduit assembly 36; (2) a motorized rotary actuator 150 coupled to stirring motor 152, (3) Electrical connector 154 with laterally extending electrical contacts 156. The electrical contacts 156 can be spring contacts that extend from the connector in the X direction.

The leading end 106 of the resin container 44 includes the fluid outlet 110, the gear 112, and the electrical connector 114 which are in alignment with the lower interface portion 50 features as a result of the action of the aligning feature 122 within slot 148. The fluid outlet 110 of resin container 44 is aligned with fluid inlet 54 of conduit assembly 36. Gear 112 is in alignment with motorized rotary actuator 150. Container electrical connector 114 contact pads 116 are in alignment with the electrical connector 154 contacts 156. The contact pads 116 face in the –X direction and the spring contacts 156 extend in the +X direction.

FIG. 8C depicts a connection between features extending from the leading end 106 of container 44 and the lower interface portion 50 features. The fluid outlet 110 has been coupled to fluid inlet 54. The motorized rotary actuator 150 has engaged the gear 112. Therefore motor 152 is mechanically coupled to the impeller 128. The spring contacts 156 are compressed against the contact pads 116. A lateral mutual contact force between the electrical connector 114 and the electrical connector 154 is directed along the X axis. Referring to FIGS. 8B and 8C, a sensor 158 is configured to sense the presence of resin in the first conduit 56.

Figure 9:
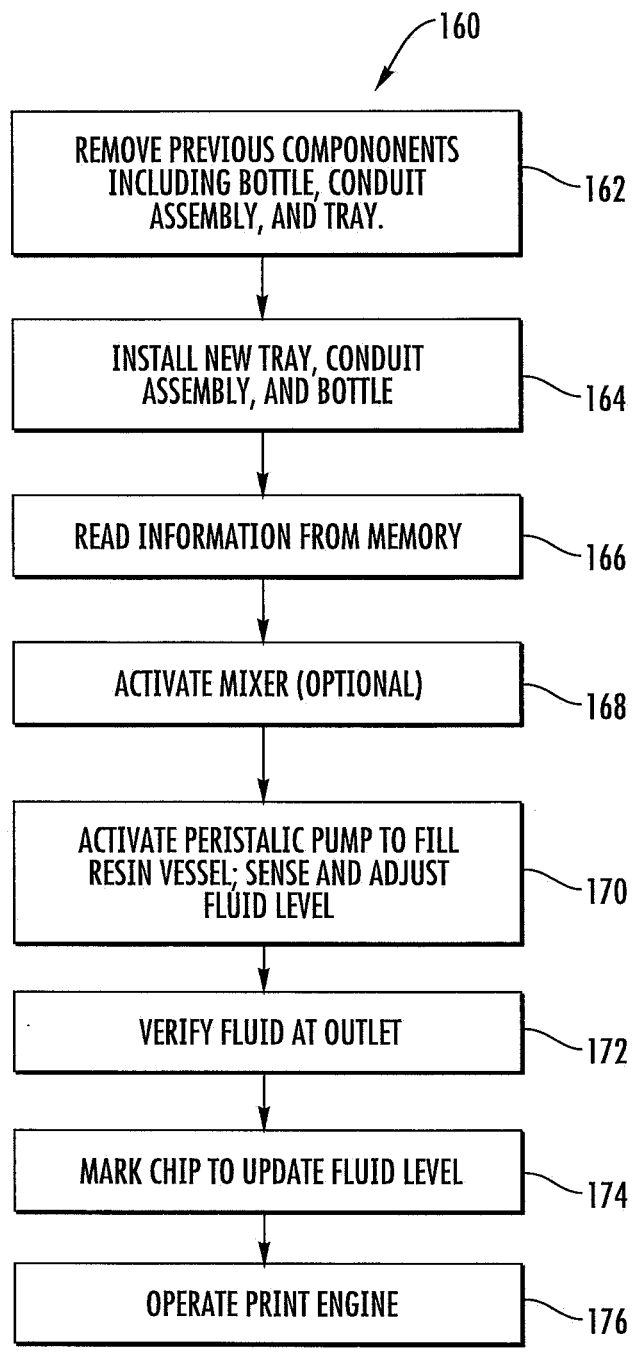
FIG. 9 is a flowchart depicting an embodiment of a method of manufacturing a three dimensional article using a three dimensional printing system. The method of manufacturing includes changing the printing system from an old or first resin to a new or second resin.

FIG. 9 is a flowchart depicting an embodiment of a method of manufacturing a three dimensional article 22 with a new or second resin with a printing system 2 that initially contains an old or first resin. The new resin is of a different type than the old resin. Contaminating the new resin with the old resin would be detrimental to the new resin and its use.

According to step 162, resin-handling components with old resin are removed. The old resin container 44 is lifted out of the receptacle 42. The old conduit assembly 36 is disconnected including unlatching the fluid inlet 54 from the interface portion 50 (see FIGS. 4A-D), disconnecting the pump head 52 from the pump motor system 46 (FIGS. 5A and 5B), and disconnecting the fluid outlet 40 from the print engine 6. Finally, the print engine 6 components (e.g., the resin vessel 10) with the older resin residue are disconnected.

According to step 164, resin-handling components with new resin are installed. A new print engine 6 component is installed (e.g., a clean and empty resin vessel 10). A new conduit assembly is installed 36 including latching the fluid inlet in the interface portion (FIGS. 4D to 4A), coupling the pump head 52 to the pump motor system 46, and mounting the fluid outlet 40 to supply resin to the print engine 6. Finally a resin container 44 with the new resin is installed in the receptacle 42 (FIGS. 8A-C).

According to step 166, the controller 8 can then read from and write to the information storage device 118 as a result of the electrical connection between connectors 114 and 154. If the new resin requires stirring, then the stirring motor 152 is activated according to step 168.

According to step 170, the controller 8 activates the pump motor 92 to begin pumping resin from the resin container 44, through the conduit assembly 36, and to the resin vessel 10. The controller concurrently monitors sensor 38 to avoid overfilling the resin vessel 10. Step 170 can continue to operate repeatedly to maintain a proper resin level in resin vessel 10.

According to step 172, the controller receives a signal from sensor 158 indicative of whether resin is present in the first conduit 56. If there is no resin in first conduit 56, then the system may halt and require installation of a new resin container 44 or a correction of a system error. According to step 174, the information storage device is updated according to an estimate or calculation of resin remaining in the internal reservoir 124. According to step 176, the print engine 6 is operated to manufacture a three dimensional article 22 with the new resin 20.

The steps of manufacturing method 160 can take place in varying orders relative to the flowchart depicted in FIG. 9. The specific embodiments and applications thereof described above are for illustrative purposes only and do not preclude modifications and variations encompassed by the scope of the following claims.

What is claimed:

1. A method of changing resin in a three dimensional printing system which includes a print engine, a used resin container installed in a receptacle, and a used conduit assembly fluidically coupling the used resin container to the print engine, the method including:
    removing the used resin container from the receptacle;
    disconnecting and removing the used conduit assembly from the printing system;
    installing a new conduit assembly into the printing system;
    installing a new resin container into the receptacle thereby coupling the new resin container to the new conduit assembly, the new conduit assembly fluidically couples the new resin container to the print engine, the new resin container and the new conduit assembly provide a sealed fluid path to the print engine to allow changing resins without contamination from the old resin, the conduit assembly includes:
    a fluid inlet configured to be affixed in the receptacle in an upward orientation to receive a downwardly extending fluid outlet from the resin container;
    a pump head configured to be mounted to a pump motor system in the printing system;
    a first conduit coupling the fluid inlet to the pump head;
    a fluid outlet configured to supply resin to the print engine; and
    a second conduit coupling the pump head to the fluid outlet,
    the pump motor system includes a mounting surface and a motorized actuator, the pump head includes an outer housing containing a rotary roller, the method includes mounting the outer housing to the mounting surface and extending and coupling the motorized actuator to the rotary roller.

2. The method of claim 1 wherein the pump motor system and the outer housing include complementary mounting features that are coupled to secure the outer housing to the mounting surface.

3. The method of claim 1 wherein the receptacle includes a lower interface portion with a latching door rotatably coupled to an interface chassis, the method includes securing the fluid inlet of the conduit assembly between the latching door and the interface chassis.

4. The method of claim 1 further comprising installing a clean resin vessel in the print engine.

5. The method of claim 4 wherein the clean resin vessel is open on an upper side, installing the conduit assembly includes positioning the fluid outlet of the conduit assembly above a portion of the resin vessel.

6. The method of claim 5 further comprising operating the pump motor system to pump new resin from the new resin container to the resin vessel to prepare for a three dimensional printing operation.

7. The method of claim 6 wherein the print engine includes a liquid level sensor proximate to the resin vessel and further comprising sensing a liquid level and halting operation of the pump motor system in response to sensing a threshold liquid level.

8. The method of claim 1 wherein the receptacle includes an electrical connector, the resin container includes an electrical connector coupled to an information storage device, installing the resin container into the receptacle couples the information storage device to the printing system.

9. A kit for changing a three dimensional printer from a first resin to a second resin, the three dimensional printer including a print engine, a pump motor system, and a receptacle, the pump motor system including a mounting surface and a motorized actuator, the kit comprising:
    a conduit assembly configured to be installed as a unit into the three dimensional printer including:
        a fluid inlet configured to be affixed in the receptacle in an upward orientation;
        a pump head configured to be coupled to a motorized pump actuator in the receptacle, the pump head including an outer housing containing a rotary roller, installing the conduit assembly includes mounting the outer housing of the pump head to the mounting surface of the pump motor system and coupling the motorized actuator of the pump motor system to the rotary roller of the pump head;
        a first conduit coupling the fluid inlet to the pump head;
        a fluid outlet configured to supply resin to the print engine; and
        a second conduit coupling the pump head to the fluid outlet, and;
    a resin container having a leading end and a trailing end relative to a direction of installation into the receptacle, the leading end including a fluid outlet that couples to the fluid inlet of the conduit assembly when the container is releasably mounted in the receptacle the resin container and the conduit assembly provide a sealed disposable fluid path for the resin and the first resin does not contaminate the second resin.

10. The kit of claim 9 wherein the fluid inlet of the conduit assembly includes an outer jacket with a downwardly tapering profile and it can therefore be securely latched into the receptacle.

11. The kit of claim 9 wherein the pump head is a peristaltic pump head including a deformable tube positioned between an outer housing and a rotary roller, the rotary roller couples to the motorized pump actuator when the conduit assembly is installed into the printer.

12. The kit of claim 9 wherein the fluid outlet of the conduit assembly includes a mount for coupling the fluid outlet above an open resin vessel in the print engine.

13. The kit of claim 9 wherein the receptacle includes a lower interface that supports the fluid inlet of the conduit assembly and a motorized actuator, the resin container including a gear coupled to an impeller, installing the resin container into the receptacle includes coupling the motorized actuator to the gear to provide motorized stirring of resin within the resin container.

14. The kit of claim 9 wherein the receptacle includes an upwardly extending electrical connector, the leading edge of the resin container including a downwardly extending electrical connector that couples to the upwardly extending electrical connector when the resin container is installed into the receptacle.

15. A method of changing resin in a three dimensional printer which includes a print engine located above a receptacle, a used resin container installed in the receptacle, a used conduit assembly fluidically coupling the used resin container to the print engine, and a controller, the receptacle including a lower interface portion and a motorized actuator, the method including:
  removing the used resin container from the receptacle thereby disconnecting the used resin container from the used conduit assembly;
  disconnecting and removing the used conduit assembly from the printing system;
  installing a new conduit assembly into the printing system, the new conduit assembly an assembled unit and separate from the three dimensional printer before installation and including:
    a fluid inlet;
    a pump head;
    a first conduit coupling the fluid inlet to the pump head;
    a fluid outlet configured to supply resin to the print engine; and
    a second conduit coupling the pump head to the fluid outlet, and;
  wherein installing the new conduit assembly includes:
    latching the fluid inlet into the receptacle in an upward orientation; and
    coupling the pump head to the motorized actuator; and
  installing a new resin container downwardly into the receptacle, the resin container including a leading and trailing end relative to the direction of installation including a downwardly extending fluid outlet, installing the new resin container downwardly causes coupling of the container fluid outlet to the conduit assembly fluid inlet.

16. The method of claim 15 further comprising the controller operating the motorized actuator to pump resin from the ink container, through the conduit assembly, and to the print engine.

17. The method of claim 16 wherein the print engine includes a resin vessel, installing the new conduit assembly includes mounting the fluid outlet of the conduit assembly above a portion of the resin vessel, operating the motorized actuator causes resin to pour out of the fluid outlet of the conduit assembly and into the resin vessel.

18. The method of claim 17 wherein the receptacle includes a sensor, installing the new conduit assembly includes routing the first conduit proximate to the sensor, the controller receiving signal from the sensor indicative of resin presence in the first conduit.

* * * * *